United States Patent [19]
Fenton et al.

[11] Patent Number: 5,093,162
[45] Date of Patent: Mar. 3, 1992

[54] LARGE-TIP COMPOSITE GOLF SHAFT

[75] Inventors: Frank Fenton, South Hadley; Thomas C. Walton, Pepperell, both of Mass.; Jeffrey W. Meyer, Escondido; Nathan A. Lopez, San Marcos, both of Calif.

[73] Assignee: Spalding & Evenflo Companies, Inc., Tampa, Fla.

[21] Appl. No.: 516,934

[22] Filed: Apr. 30, 1990

[51] Int. Cl.⁵ .................. B32B 5/12; A63B 53/10; B65H 81/00
[52] U.S. Cl. .................. 428/34.5; 428/34.7; 428/368; 273/77 R; 273/80 A; 273/80 B; 273/80 C; 273/80 R; 138/130; 138/132; 138/144; 156/188; 156/190
[58] Field of Search .............. 428/34.5, 34.7, 35.9, 428/113, 367, 368, 408; 273/77 R, 80 R, 80 A, 80 B, 80 C; 156/187-192; 138/130, 132, 137, 144

[56] References Cited

U.S. PATENT DOCUMENTS

| | | | |
|---|---|---|---|
| 3,313,541 | 4/1967 | Benkoczy et al. | 273/80 |
| 3,998,458 | 12/1976 | Inoue et al. | 273/80 R |
| 4,023,801 | 5/1977 | Van Auken | 273/80 B |
| 4,097,626 | 6/1978 | Tennent | 428/36 |
| 4,132,579 | 1/1979 | Van Auken | 156/189 |
| 4,319,750 | 3/1982 | Roy | 273/80 B |
| 4,455,022 | 6/1984 | Wright | 273/77 A |
| 4,757,997 | 7/1988 | Roy | 273/80 R |

FOREIGN PATENT DOCUMENTS 1261541  1/1972  United Kingdom .

Primary Examiner—James J. Seidleck
Assistant Examiner—Charles R. Nold
Attorney, Agent, or Firm—Donald R. Bahr; John E. Benoit

[57] ABSTRACT

A composite golf club shaft and the method of constructing the shaft is disclosed. The hollow circular shaft includes a standard butt end having a constant outside diameter along a length of the shaft and a tip end having a constant outside diameter sustantially larger than the tip of a standard shaft, with the constant diameter of the tip end and butt end extending along predetermined lengths of the shaft. An intermediate section of the shaft tapers between the diameters of the butt and tip ends. The shaft is manufactured by wrapping a group of circumferential sections about a mandrel, each layer comprising either standard modulus carbon-graphite fibers or fiberglass fibers in a matrix, with the finished product being heat-cured to produce a golf club shaft.

19 Claims, 2 Drawing Sheets

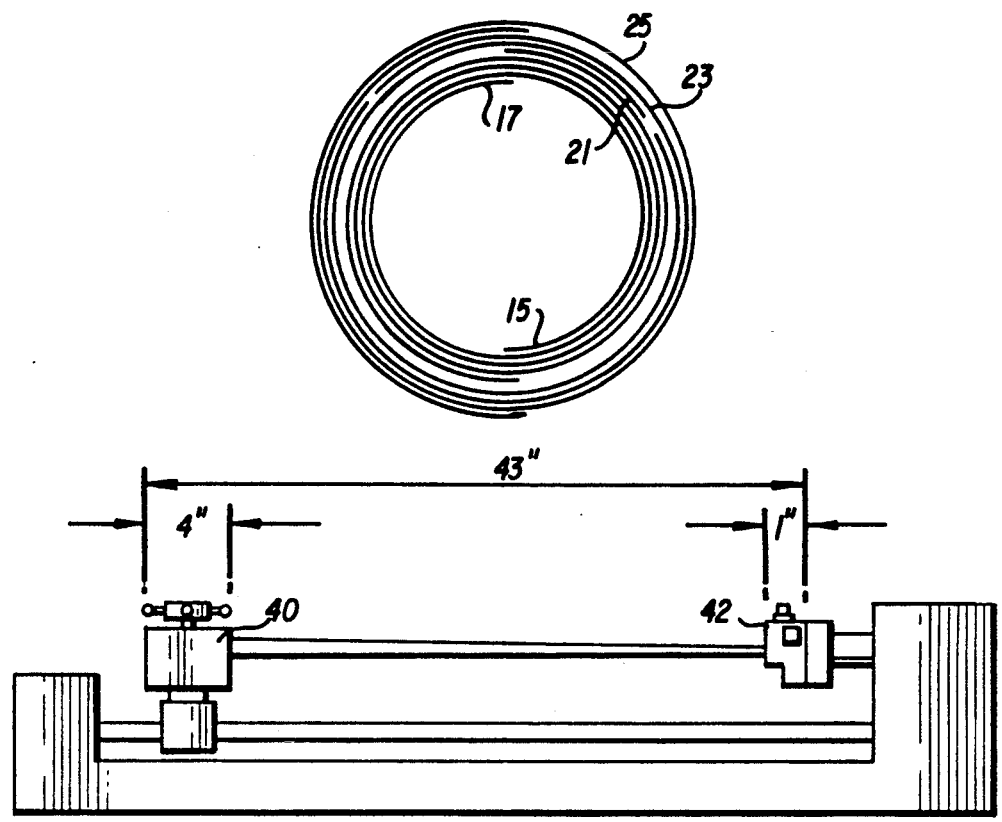
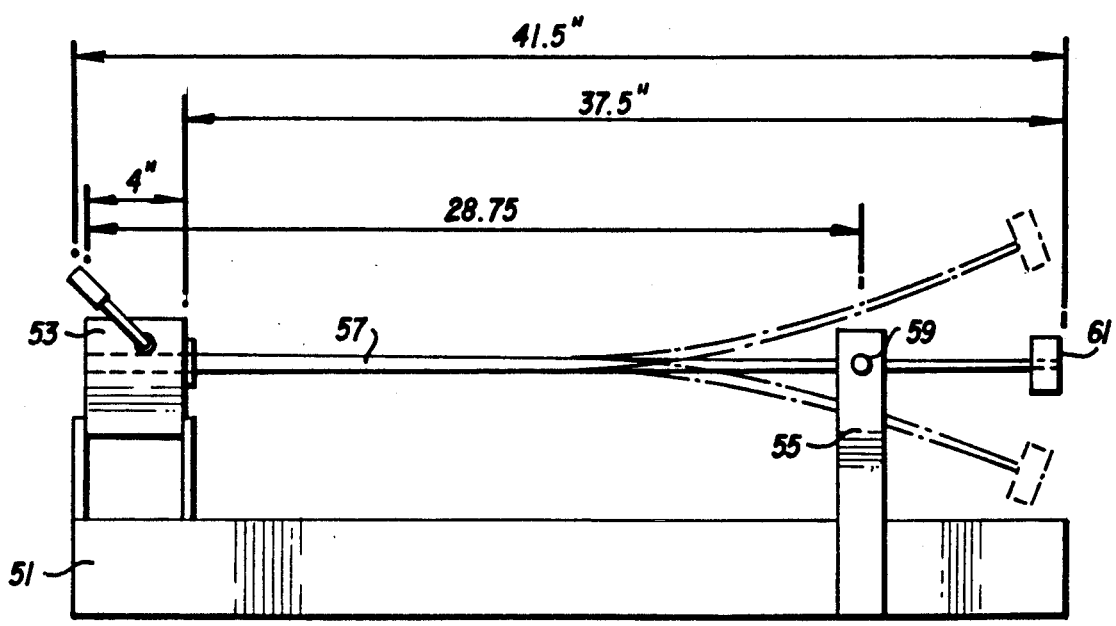

LARGE-TIP COMPOSITE GOLF SHAFT

The present invention generally relates to golf club shafts and the manufacturing of such shafts and more particularly to the manufacture of a golf club shaft having a larger than normal outside diameter at the tip end with the shaft being a composite shaft constructed of a plurality of circumferential sections which make up the thickness of the shaft. These sections are comprised of standard modulus carbon-graphite fibers in a matrix and fiberglass fibers in a matrix.

BACKGROUND OF THE INVENTION

The use of carbon-graphite fibers in a matrix for constructing a composite shaft for various pieces of sporting equipment is well known. Specifically, numerous shafts have been constructed of carbon-graphite reinforced composite material by wrapping lamination of plies of fibers impregnated with uncured epoxy onto a mandrel having the desired shape of the finished product and subsequently cured into that final shape. Normally a plurality of laminations are built up in this manner. Various proposals for location of the fibers relative to the longitudinal axis of the shaft have been proposed and have been manufactured.

As is well known, high modulus carbon-graphite fiber fabrication is much more expensive than standard modulus carbon-graphite and shafts made from carbon-graphite fiber for greater torsional stiffness of necessity are quite expensive.

The present invention provides a shaft having a plurality of circumferential sections which make up the shaft, with only a partial number of the sections comprising standard modulus carbon-graphite fibers in an epoxy resin matrix and the remaining outer portions comprising fiberglass fibers in a matrix. The circumferential sections comprise at least two inner plies of angle carbon-graphite at opposing angles, at least one zero ply of fiberglass, and at least one zero ply of standard modulus carbon-graphite. In order to provide the strength at the hosel for this type of shaft, which is the equivalent of the strength provided by typical regular hosel diameter standard modulus carbon-graphite reinforced composite golf shafts, the tip end of the shaft where it is connected to the hosel of the club head is of a substantially larger diameter than the standard golf club shaft. By using the specific method of the present invention of enlarging the tip outside diameter and laying the oriented standard modulus standard modulus carbon-graphite fibers with the proper proportion of lower-cost fiberglass reinforcement in the outer layers of the laminate, a very good performance shaft results which is suitable for a wide range of players.

The invention will be more clearly understood from the following description, taken together with the drawings.

BRIEF DESCRIPTION OF THE DRAWINGS

FIG. 7 is a schematic representation of an enlarged cross-sectional view taken along the lines 7—7 of FIG. 6;

FIG. 9 is an illustration of apparatus used for analyzing the movement in degrees of a shaft as a result of the application of torque; and FIG. 10 is a diagramatic illustration of apparatus for measuring shaft frequency in cycles per minute.

DETAILED DESCRIPTION OF THE DRAWINGS

In the following discussion, certain components used are referred to by terms used in the art. These terms are defined as follows:

Carbon-Graphite Fibers

Standard modulus [tensile modulus (30–38) million psi].
T-300 type (tensile modulus 33 million psi).
T-300 is the brand name used for both Amoco (USA) and Toray (Japan) for these company's standard modulus carbon-fiber products.

S-2 Type Fiberglass

Specially formulated fiberglass with higher tensile strength than E type (electrical) fiberglass which is made exclusively by Owens Corning in the United States. Some close copies known as T glass are also available in Japan.

Epoxy Resin Matrix

Amine-cured DGEBPA epoxy. DGEBPA is short for diglycidol ether BisPhenol-A, which is a type of epoxy resin.

Figure 1:
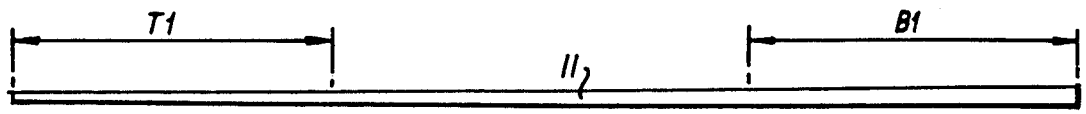
FIG. 1 is a plan view of the mandrel used in making the club of the present invention.

Referring to FIG. 1, there is shown steel mandrel 11, which is configured to manufacture the shaft of the present invention. Mandrel 11 includes a butt end having a nearly constant diameter over the length B1, and a tip end having a nearly constant diameter over the length T1. The intermediate section tapers to interconnect the butt end and tip end sections. The mandrel has a geometrical configuration designed to produce the enlarged outside diameter of the tip end discussed below. It is to be understood that steel mandrel 11 is much longer than the final shaft. The composite shaft formed as discussed below is removed from the mandrel and cut to the final desired dimensions.

Figure 2:
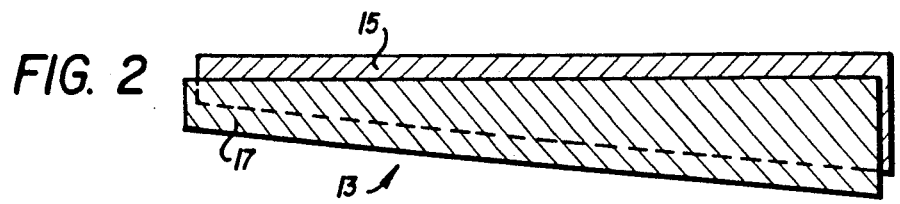
FIGS. 2-5 are schematic views of the various plies used in constructing the shaft of the present invention.

FIG. 2 illustrates the first plies which are used to provide inner circumferential section 13 of the thickness of the shaft. Inner circumferential section 13 is comprised of inner ply 15 and outer ply 17, each ply forming a trapezoidal-shaped pattern. As can be seen, the axial fiber orientation in plies 15 and 17 are of opposite angular inclination. Thus, inner ply 15 includes fibers in a matrix which are oriented at an angle, preferably of $-45°$, relative to the longitudinal axis of the mandrel and, thus, the ultimate longitudinal axis of the shaft. Outer ply 17 has fiber orientation which is at an angle, preferably $+45°$, relative to the longitudinal axis of the mandrel, with the mandrel butt at 0° and tip at 180° for reference. Plies 15 and 17 comprise a plurality of parallel reinforcing fibers in an epoxy matrix material with fibers oriented as shown. Ply 17 is applied on top of ply 15 but is displaced circumferentially from ply 15 by a distance equal to one-half the circumference of mandrel 11.

Plies 15 and 17 are applied to mandrel 11 in a now well known manner. Inner circumferential section 13, comprising plies 15 and 17, is rolled onto the circumference of mandrel 11. In the present invention, plies 15 and 17 are of a width such that they are wound twice about mandrel 11, resulting in four plies at the inner portion of the shaft, with the plies alternating with each other so as to provide torsional stiffness resulting from the two opposed angles of the fibers.

Figure 3:

FIG. 3 discloses the triangular tip reinforcing ply 19 and trapezoidal butt reinforcing ply 21. These plies are constructed of standard modulus carbon-graphite reinforcing fibers in a matrix material. As can be seen, the fibers of these plies are parallel to each other and are substantially longitudinal so as to provide a pitch angle of inclination to the longitudinal axis of the mandrel at substantially 0°. These plies are geometrically cut so as to mate with the nearly constant diameter portion of the tip end and the nearly constant diameter portion of the butt end. They are wrapped around the first plies, which have already been mounted on the mandrel.

Figure 4:
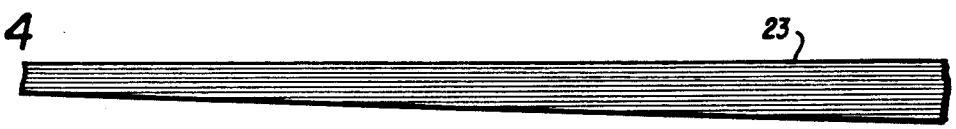

FIG. 4 discloses a ply having a substantially trapezoidal configuration. Again, the fibers of these plies are longitudinal so as to provide a pitch angle of inclination to the longitudinal axis of the shaft at substantially 0°. The fibers in this ply are preferably standard modulus carbon-graphite.

Figure 5:

FIG. 5 describes the last basic two-ply structure of the shaft, also configured in the same manner as the layer of FIG. 4 except this sheet forms two layers rather than one. The use of lower modulus high strength fiberglass reinforcement for this particular ply will be discussed subsequently.

Figure 6:
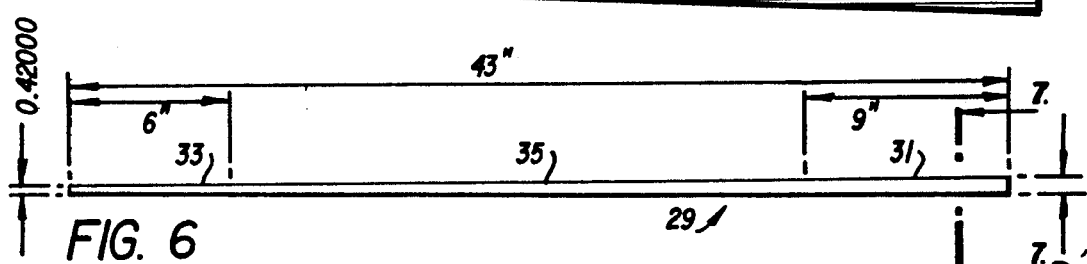
FIG. 6 is a plan view of a completed club shaft.

Once all of the plies have been wound on the mandrel, the shaft is polypropylene tape wrapped, cured, removed from the mandrel, and sanded to its final geometric tolerances using conventional techniques. The resultant shaft is shown in FIG. 6. The overall length of this particular shaft is 43 inches, with the butt end having a nearly constant outside diameter of 0.620 inch for a length of nine inches and a tip end having a nearly constant outside diameter of 0.420 inch for a length of six inches.

In the preferred standard shaft, the fibers in FIGS. 2, 3, and 4 numbered 15, 17, 19, 21, and 23 are standard modulus carbon-graphite fibers in an amine-cured DGEBPA-Epoxy matrix material, while the fibers in the outer two layers of the laminated shaft consist of S-2 type fiberglass in the same epoxy matrix.

If a stiffer beam version of the shaft is desired without altering the torsion stiffness, the carbon graphite can be adjusted in FIGS. 4 and 5 to a higher ratio where fiberglass is displaced by standard modulus carbon-graphite by altering the number of plies or fiber aerial weight of each type depending on the stiffness desired.

Additionally, the club could be constructed so that both of the plies of FIGS. 4 and 5 could be of fiberglass in a DGEBPA-Epoxy matrix material for a very flexible shaft.

In each of the combinations, the shaft still maintains the relatively large tip end where it meets the hosel of the club head and the same degree or torsional stiffness. The outside diameter of the tip end is between 0.40 inch and 0.44 inch and, preferably, is substantially 0.420 inch. The outside diameter of the butt end is between 0.61 inch and 0.63 inch, but may vary under standard practice.

FIG. 7 is an enlarged schematic sectional view of the shaft of FIG. 6 taken along the lines 7—7 and identifying the various layers which comprise the shaft structure. The windings are depicted schematically for purposes of clarity. Obvious butt joints which occur are depicted. It is to be understood that a schematic sectional view taken through the intermediate section of the shaft would not show circumferential layers 19 or 21, which are the tip and butt end reinforcing sections, respectively.

The shaft of the current invention uses unidirectional prepreg of standard modulus carbon-graphite fibers (such as (T-300 brand available from Amoco) and high strength type fiberglass reinforcements (such as S-2 brand available from Owens Corning) described as follows:

(1) Standard modulus carbon-graphite prepreg with about 150 gms/meter$^2$ fiber aerial weight (FAW) impregnated with about 34% epoxy resin content (by weight), which is commercially available.

(2) High strength type S-2 brand fiberglass prepreg with about 190 gms/meter$^2$ fiber aerial weight (FAW) impregnated with about 34% epoxy resin content (by weight), which is commercially available. [Alternatively, E-type fiberglass or other inorganic or organic reinforcements with a similar Young's Modulus could be substituted for the high strength type fiberglass (such as S-2 brand), but the high strength type is preferred for its high tensile strength.]

In order to vary the flexibility (e.g., flex pattern) over the range specified, the standard modulus carbon-graphite fiberglass ratio (by volume) can be adjusted in the layers of FIGS. 4 and 5 to a higher value if a stiffer shaft is required. Inversely, the fiber aerial weight (FAW) of the standard modulus carbon-graphite of FIG. 4 can be reduced while increasing the FAW layer shown in FIG. 5, maintaining the composite at the same volume in order to create a more flexible shaft for a lower swing speed player. High torsional stiffness would also be maintained.

Figure 8:
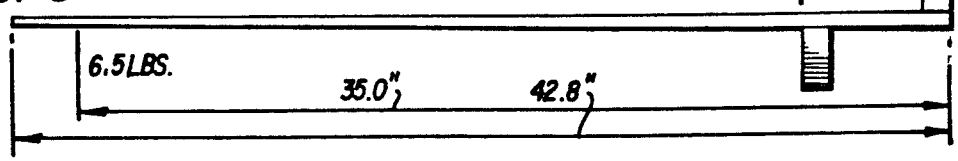
FIG. 8 is an illustration of a procedure utilized to measure the flexibility of wood shafts.

FIG. 8 shows a method of checking shaft deflection. The butt of the shaft is captured between two "V" blocks and the tip extends out 42.8".

A 6.5-pound weight is hung on the shaft 35" from the butt end. After the shaft is under load, the distance that the shaft has deflected down, due to the load, is measured at 42.8" from the top edge of the shaft on the deflection board. This measurement in inches is converted by use of the chart set forth below to a flex number. The flex numbers of the present invention are −1, 0, 1, and 2, which equate to a deflection of 5.35" to 4.55". This is the deflection range of the present invention. It should be noted that the shaft tested comprised the preferred construction discussed above.

| FLEX RANGE OF ALL WOODS | | | | |
|---|---|---|---|---|
| | INCHES IN DEFLECTION | FLEX | FLEX NO. | READ AT |
| PRESENT INVENTION FLEX RANGE | 5.15 to 5.35 | | −1 | 42.8" |
| | 4.95 to 5.15 | | 0 | |
| | 4.75 to 4.95 | — | 1 | |
| | 4.55 to 4.75 | — | 2 | |
| | 4.15 to 4.55 | XL | 3/4 | |
| | 3.75 to 4.15 | L | 5/6 | |
| | 3.35 to 3.75 | R | 7/8 | |
| | 2.95 to 3.35 | F | 9/10 | |
| | 2.55 to 2.95 | S | 11/12 | |

Listed below are test results for (A) a shaft having layers using standard modulus carbon-graphite fibers in the prepregs of FIGS. 2–4 and S-2 brand, high strength type fiberglass fibers in the two prepreg layers of FIG. 5 with a tip diameter of 0.420"; (B) a shaft made of standard modulus carbon-graphite with a boron tip for reinforcement with a tip diameter of 0.335"; (C) a standard steel shaft with a tip diameter of 0.335"; and (D) a shaft having standard modulus carbon-graphite fibers in the prepreg layers of FIGS. 2, 3, and 5 and S-2 brand, high strength type fiberglass fibers in the prepreg layers of FIG. 4 having a tip diameter of 0.420".

| SHAFT | INCHES OF DEFLECTION | FLEX NO. |
|-------|----------------------|----------|
| (A)   | 5.18"                | −1       |
| (B)   | 4.31"                | 3/4      |
| (C)   | 4.24"                | 3/4      |
| (D)   | 3.44"                | 7/8      |

FIG. 9 illustrates a torque analyzing machine testing the preferred shaft of the present invention. In order to measure a shaft equivalent to a shaft having a length of 41.5 inches, the 43" test shaft of FIG. 6 is installed in the torque analyzer with the butt end clamped firmly in butt fixture 40. The shaft tip is inserted 1" into tip fixture 42. The tip fixture has a 1-foot length bar extending out of it horizontally and a 1-pound weight is hung from the bar, thus equalling 1-foot-pound of torque exerted on the tip of the shaft.

The amount of movement in degrees shows how much the shaft is affected by 1-foot-pound of torque applied at the tip (i.e., 1° of torque reading is a very small angular displacement, 12° of torque reading is a large angular displacement).

The results of the test of the preferred embodiment of the present invention showed a torque rating between 2.5° and 4.1°.

FIG. 10 illustrates apparatus used to determine vibration frequency of a golf shaft. Base 51 has a collet clamp 53 mounted at one end and support arms 55 mounted at the other end. Photoelectric sensing means 59 are mounted at the upper ends of arms 55. The butt end of shaft 57 is mounted in clamp 53 so as to extend substantially horizontally so as to pass between the light and photocell. A metal weight 61 of 194.5 grams is secured to the end of shaft 57. Weight 61 is depressed and released and the photoelectric sensing means records the vibration in cycles per minute. This testing apparatus is well known in the industry and readily available.

The shaft having standard modulus carbon-graphite reinforcing fibers in the prepregs of FIGS. 2-4 and S-2 brand fiberglass reinforcement in the outer two layers (FIG. 5) has a vibration frequency of 260 CPM to 275 CPM. A standard stiff steel shaft with a tip diameter of 0.335" has a vibration frequency of 306 CPM. It should be noted that the lower CPM results in a softer shaft flex.

Tests were also conducted which compare shock transmittal up the shaft when a ball is struck. These tests were conducted as follows:

Two identical vibration sensors are placed on the shaft. One is placed longitudinally on the shaft at the tip end, the other at the grip end. The sensors, piezo Kynar strips, have their signals amplified and their voltages monitored by the computer data collection at 20,000 samples per second. The data from these sensors, taken over a period of 0.001 second, detect the shock received at the tip part of the shaft, followed some 0.3 to 5 milliseconds later by the shock reaching the grip part of the shaft.

Three shafts were tested:

(A) a standard steel shaft with a tip diameter of 0.335";

(B) a shaft made of more expensive high modulus type carbon-graphite with a boron tip for reinforcement with a tip diameter of 0.335";

(C) a shaft having layers using standard modulus type carbon-graphite fibers in the prepreg layers of FIGS. 2-4 and S-2 brand fiberglass fibers in the prepreg layers of FIG. 5 with a tip diameter of 0.420".

The measurement of transmitted shock is obtained by measuring the maximum shock vibration amplitude received at the tip divided into the same maximum measurement from the corresponding grip data. Each shaft was hit three times to show repeatability. The following table summarizes the results:

| Hit | Shaft | Shock Transmission Ratio Grip/Tip (Percentage) |
|-----|-------|------------------------------------------------|
| 1   | A     | 93                                             |
| 1   | B     | 74                                             |
| 1   | C     | 53                                             |
| 2   | A     | 91                                             |
| 2   | B     | 85                                             |
| 2   | C     | 71                                             |
| 3   | A     | 90                                             |
| 3   | B     | 75                                             |
| 3   | C     | 69                                             |

As will be obvious from the above results, substantially reduced shock is transmitted up the shaft to the grip in the shaft of the present invention.

The shafts of the present invention are constructed as discussed above and have a tip end of substantially 0.420 inch outside diameter with this diameter extending approximately five to ten inches along the shaft. The tip end may be trimmed to achieve the desired flex. Referring to the preferred embodiment discussed above, the tip end is preferably trimmed so as to have a constant diameter extending six inches from the tip end of the shaft. This construction provides superior vibration dampening (primarily attributable to the fiberglass layers of FIG. 5), which results in a highly playable shaft. Such a shaft has a weight of between 77 and 85 grams.

The shaft is playable and easy to hit for all levels of golfers, as exhibited during live golfer testing with very good golfers, strong swingers, average golfers, smooth-swinging golfers, and older, slower-swinging golfers. All swing speeds and talent levels of live golfers see an increase in distance.

Robotic golfer tests have proven that performance is better than the most popular steel shaft on the market in regard to accuracy at fast and average swing speeds, and the robot shows a substantial gain in carry distance at the slower speeds that average golfers use.

Robotic golf test results of drivers at 130 f.p.s. (89 miles per hour) "average golfer" swing speeds are as follows:

|                                                   | Carry Distance (Yards) | Trajectory | Lateral Dispersion (Yards) |
|---------------------------------------------------|------------------------|------------|----------------------------|
| Control Shaft (Sheel Shaft Tru Temper Dynamic Gold) |                        |            |                            |
| Center Hit                                        | 187                    | 8.1        | −.50                       |
| Toe Hit                                           | 182                    | 7.2        | +.50                       |
| Heel Hit                                          | 182                    | 8.1        | −3.20                      |
|                                                   |                        |            | Spread of 3.70             |
| Large Tip Composte Preferred Six-Inch             |                        |            |                            |

-continued

|  | Carry Distance (Yards) | Trajectory | Lateral Dispersion (Yards) |
|---|---|---|---|
| Constant Tip End Outside Diameter of 0.42 Inch | | | |
| Center Hit | 197 | 10.6 | +2.45 |
| Toe Hit | 192 | 10.2 | +.90 |
| Heel Hit | 191 | 10.3 | −.40 |
| | | | Spread of 2.85 |

The length of both shafts was substantially the same.

The range of synthetic thermoplastic and thermosetting polymeric materials which can be used in accordance with this invention as a matrix material, other than the above-described epoxy as well as other thermosetting polymer resins such as vinylester and polyester, is quite broad. Suitable homopolymeric and copolymer materials which may be adapted for use in this invention are as follows:

(1) Vinyl resins formed by the polymerization of vinyl chloride or by the copolymerization of vinyl chloride with vinyl acetate, acrylic esters and vinylidene chloride.

(2) Polyolefins such as polyethylene, polypropylene, polybutylene and copolymers such as polyethylene methylacrylate, polyethylene ethylacrylate, polyethylene vinyl acetate, polyethylene methacrylic or acrylic acid or polypropylene acrylic acid.

(3) Polyurethanes such as are prepared from polyols and diisocyanates or polyisocyanates.

(4) Polyamides such as poly (hexamethylene adipamide) and others prepared from diamines and dibasic acids, as well as those from amino acids such as poly (caprolactam).

(5) Acrylic resins as exemplified by the copolymers of methylmethacrylate, acrylonitrile, styrene, meleic anhydride, etc. and blends of these resins with poly vinyl chloride, elastomers, etc.

(6) Polyphenylene oxide resins, or blends of polyphenylene oxide with high impact polystyrene as sold under the trademark "Noryl" by General electric Company, Pittsfield, Mass.

(7) Thermoplastic polyesters, such as PET, PBT, PETG and elastomers sold under the trademarks "Hytrel" by E. I. DuPont de Nemours & Company of Wilmington, Del., and "Lomod" by General Electric Company, Pittsfield, Mass.

(8) Polycarbonate, including blends or alloys including polycarbonate with ABS, PBT, PET, SMA, PE, PPS, PPO, etc. Blends of polyethylene, polypropylene, polyacetal, nylon, polyesters, cellulose esters, etc.

In the above description shorthand symbols are used to describe certain polymers. The symbols used and their description are as follows:

| ABS | Acrylonitrile butadiene styrene |
| PBT | Polybutylene terephthalate |
| PET | polyethylene terephthalate |
| SMA | Styrene maleic anhydride |
| PE | Polyethylene |
| PETG | Polyathylene terephthalate/glycol modified |
| EPDM | Ethyl-propylene-non-conjugated diene terpolymer |
| PVC | Polyvinyl chloride |
| EVA | Ethylene vinyl acetate |
| PPS | Polyphenylene sulfide |

-continued

| PPO | Polyphenylene oxide |

The above list is not meant to be limiting or exhaustive, but merely illustrates the wide range of thermoplastic and thermosetting polymeric materials which may be employed as a matrix in the present invention. Mixtures of the above-described materials may also be used.

It is within the purview of this invention to add to the matrix compositions of this invention compatible materials which do not affect the basic novel characteristics of the composition of this invention. Among such materials are antioxidants, antistatic agents, U.V. inhibitors, and stabilizers.

As can be seen from the discussion above, the subject invention can be used in conjunction with a wide variety of polymeric materials which are suitable for the formation of the composite matrix.

As will now be evident, the shaft of the present invention contains separate layers of standard modulus carbon-graphite fibers in a matrix and fiberglass fibers in a matrix. The characteristics of the shaft may be controlled through selective variations of these layers.

The above description and drawings are illustrative only since variations in fiber size and density could be used without departing from the invention, which is to be limited only by the scope of the following claims.

We claim:

1. A hollow golf club shaft comprising
   at least two inner plies of angle carbon-graphite fibers oriented at opposing angles, one ply at substantially a +45° angle and the opposing ply at substantially a −45° angle, laminated in a matrix; at least one ply of fiberglass fibers in the zero orientation with respect to the longitudinal axis of the shaft laminated in a matrix;
   at least one ply of carbon-graphite fibers in the zero orientation with respect to the longitudinal axis of the shaft laminated in a matrix;
   the tip end of said shaft having a diameter between 0.400 inch and 0.440 inch and extending a predetermined distance from the tip; and
   an intermediate tapering section of said shaft extending between said butt end and said tip end.

2. The golf club shaft of claim 1 wherein said tip end outside diameter is substantially 0.420 inch along said predetermined distance.

3. The hollow golf club shaft of claim 1 wherein said tip end has a substantially constant diameter over substantially 9/64ths the length of the shaft and said butt end has a substantially constant diameter over substantially two-ninths the length of the shaft, and said intermediate tapering section extends the remaining length of said shaft.

4. The golf club shaft of claim 1 wherein said shaft is substantially 41.5 inches, said tip end of said shaft has a substantially constant diameter over 6 inches of said shaft, and said butt end of said shaft has a constant diameter over 7.5 inches of said shaft, with said intermediate section extending between the inner termination of said substantially constant diameters.

5. The golf club shaft of claim 2 wherein the length of said shaft is 41.5" and has a tip end deflection between 4.55 inches and 5.15 inches when the butt end is secured in a fixed position and a 6.5-pound weight is hung on the shaft 35 inches from the butt end.

6. The golf club shaft of claim 2 wherein said shaft has a torque rating of between 2.5° and 4.1° using a 1.0-pound weight and a 12-inch moment arm while the shaft is clamped 3 inches from the tip and 6 inches from the butt end.

7. The golf club shaft of claim 1 wherein said carbon-graphite fibers are a standard modulus type, said fiberglass fibers are high strength type and the matrix consists of an amine-cured DGEBPA type epoxy.

8. The golf club shaft of claim 1 wherein said fiberglass fibers are of the E-type.

9. The golf club shaft of claim 1 wherein the ratio by volume of said carbon-graphite fibers and said fiberglass fibers is selected so as to provide a desired shaft flexibility while maintaining torsional stiffness.

10. The golf club shaft of claim 1 wherein said matrix is a thermosetting polymer.

11. The golf club shaft of claim 1 wherein the matrix is an epoxy resin.

12. The golf club of claim 1 wherein the matrix is a thermoplastic polymer.

13. A method of forming a hollow composite golf club shaft comprising
   providing a mandrel of circular cross-section having a first section with a substantially constant diameter extending a predetermined distance at one end, a second section having a substantially constant diameter smaller than said first diameter extending a predetermined distance at the other end, and an intermediate tapered section extending between said first and second sections;
   forming a two-ply section of carbon-graphite fibers in a matrix material having a predetermined length L, with the individual plies having opposed fiber direction angles relative to the axis of said mandrel, one of said plies at substantially a +45° angle and the opposing ply at substantially a −45° angle;
   wrapping said two-ply section twice around said mandrel; forming a third section comprising butt ad tip carbon-graphite fibers in a matrix material having in-line fiber orientation direction;
   wrapping said butt and tip sections around said two-ply section, with the fibers in said butt and tip sections extending at a 0° angle with the axis of said mandrel;
   forming a fourth section having carbon-graphite fibers in a matrix material having length L, said fourth section having in-line fiber direction;
   wrapping said fourth section about said two-ply section and said butt and tip sections, with the fibers of said fourth section extending at a 0° angle with the axis of said mandrel;
   forming a fifth two-ply section having fiberglass fibers in a matrix material having length L and having in-line fiber direction; and
   wrapping said fifth section around said fourth section, with the fibers in said fifth section extending at a 0° angle with the axis of said mandrel.

14. A composite golf club shaft having a butt end and a tip end comprising
   an inner circumferential section of the thickness of said shaft comprising two plies;
   each of said plies having two turns around said shaft;
   each of said plies comprising a plurality of parallel reinforcing carbon-graphite fibers in matrix material oriented in longitudinal aspect at a pitch angle of inclination to the longitudinal axis of said shaft;
   the fibers in alternate plies having pitch angles of opposite inclination, one of said plies at substantially a +45° angle and the opposing ply at substantially a −45° angle;
   a second section of the thickness of said shaft comprising a circumferential butt end stiffener and a circumferential tip end stiffener, each of said stiffeners comprising a plurality of parallel reinforcing carbon-graphite fibers in matrix material oriented in longitudinal aspect at a pitch angle of inclination to the longitudinal axis of said shaft at substantially 0°;
   third and fourth circumferential sections of the thickness of said shaft, each comprising plies having a plurality of parallel reinforcing fibers in matrix material oriented in longitudinal aspect at a pitch angle of inclination to the longitudinal axis of said shaft at substantially 0°; and
   the tip end having an outside diameter between 0.400 inch and 0.440 inch extending a predetermined distance from the tip.

15. The golf club shaft of claim 14 wherein the fibers in said third circumferential section are standard modulus carbon-graphite and the fibers in said fourth circumferential section are fiberglass.

16. The golf club shaft of claim 14 wherein the fibers in said third circumferential section are fiberglass fibers and the fibers in said fourth circumferential section are standard modulus carbon-graphite fibers.

17. The golf club shaft of claim 14 wherein said butt end diameter is constant for a predetermined distance along said shaft and said intermediate section joining the tip and butt ends is tapered.

18. The golf club shaft of claim 14 wherein said predetermined distance of said tip end has a diameter of substantially 0.420 inch.

19. The golf club shaft of claim 14 wherein the tip end diameter is 0.420 inch and is constant for a length of six inches.

* * * * *